(12) United States Patent  (10) Patent No.: US 7,460,173 B2
Lundblad et al.  (45) Date of Patent: *Dec. 2, 2008

(54) METHOD AND APPARATUS FOR SYNCHRONIZING AUDIO AND VIDEO DATA

(75) Inventors: James Lundblad, Mountain View, CA (US); Ramaneek Khanna, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/171,864

(22) Filed: Jun. 30, 2005

(65) Prior Publication Data

US 2005/0238059 A1    Oct. 27, 2005

Related U.S. Application Data

(63) Continuation of application No. 10/978,874, filed on Nov. 1, 2004, now Pat. No. 7,268,826, which is a continuation of application No. 10/039,221, filed on Jan. 4, 2002, now Pat. No. 6,906,755.

(51) Int. Cl.
    H04N 9/475    (2006.01)
(52) U.S. Cl. ..................... 348/515; 348/512
(58) Field of Classification Search ......... 348/512–515; H04N 9/475
    See application file for complete search history.

(56) References Cited

U.S. PATENT DOCUMENTS

| 5,583,652 | A |   | 12/1996 | Ware |
| 5,640,388 | A |   | 6/1997  | Woodhead et al. |
| 5,668,601 | A |   | 9/1997  | Okada et al. |
| 5,808,722 | A | * | 9/1998  | Suzuki ................. 352/12 |
| 6,262,776 | B1 |  | 7/2001  | Griffits |
| 6,285,405 | B1 |  | 9/2001  | Binford, Jr. et al. |
| 6,313,879 | B1 |  | 11/2001 | Kubo et al. |
| 6,516,005 | B1 |  | 2/2003  | Murayama et al. |
| 6,906,755 | B2 |  | 6/2005  | Lundblad et al. |
| 2003/0128294 | A1 | * | 7/2003 | Lundblad et al. ......... 348/515 |

OTHER PUBLICATIONS

Ramamoorthy, V., "Clock Synchronization in Software MPEG-2 Decoder" SPIE vol. 3021 pp. 194-210, 1997.

Noro, R. et al., "Improving Clock Synchronization for MPEG-2 Services over ATM Networks" Telecommunications Services Group TCOM Laboratory Swiss Federal Institute of Technology pp. 176-188, 1997.

Lu, G J et al., "Mechanisms of MPEG Stream Synchronization" ACM SIGCOMM Computer Communication Review pp. 57-67, 1994.

Sung, C., "On the MPEG audio-video synchronization" SPIE vol. 3021 pp. 224-231, 1997.

Blersack, E. et al., Synchronized delivery and playout of distributed stored multimedia streams' Multimedia Systems 7. 1999, pp. 70-90.

Benslimane, A., "A Multimedia Synchronization Protocol for Multicast Groups" IEEE 2000 pp. 456-463, 2000.

* cited by examiner

Primary Examiner—M. Lee
(74) Attorney, Agent, or Firm—Lee & Hayes, PLLC

(57) ABSTRACT

A system receives a transport stream containing video data and audio data. A determination is made regarding the time required to process the video data contained in the transport stream and the time required to process the audio data contained in the transport stream. The system then determines a difference in time to process the video contained in the transport stream as compared to the audio data contained in the transport stream. Presentation of the audio data is delayed by this difference in time to synchronize presentation of the audio data with presentation of the video data.

13 Claims, 9 Drawing Sheets

METHOD AND APPARATUS FOR SYNCHRONIZING AUDIO AND VIDEO DATA

RELATED APPLICATIONS

This application is a Continuation of co-pending application Ser. No. 10/978,874, filed Nov. 1, 2004, entitled "Method and Apparatus for Synchronizing Audio and Video Data", and incorporated herein by reference.

That application is a Continuation of application Ser. No. 10/039,221, filed Jan. 4, 2002, entitled "Method and Apparatus for Synchronizing Audio and Video Data", and also incorporated herein by reference.

TECHNICAL FIELD

This invention relates to synchronizing audio data such that the audio data is played with the appropriate video data.

BACKGROUND OF THE INVENTION

Various types of data streams contain both encoded video data and encoded audio data. Typically, a particular portion of the video data in a data stream corresponds with a particular portion of the audio data in the data stream. For example, if the video data is displaying a particular person speaking, the corresponding audio data presents the words or sounds uttered by that particular person. In this example, the presentation of the audio data should be synchronized with the presentation of the video data such that the movement of the speaker's lips at a particular moment corresponds to the word or sound being uttered.

A decoding device, such as a set-top box or other computing device, receives a data stream and decodes the video data and audio data contained in the data stream. The time required to decode and process the video data may differ from the time required to decode and process the audio data. This time difference may occur due to differences in the hardware components and/or software routines that process the video data and the audio data. Additionally, a particular time period of video data (e.g., one second) typically contains substantially more data than the same time period of audio data. Thus, the video data typically requires more processing than the audio data. Since the audio data may be processed faster than the video data, the audio data may not be ready for presentation while the video data is still being processed.

Additionally, different clock signals (having different frequencies) may be used for processing the video data and the audio data. If these clocks are not synchronized, the audio data and video data may not be processed at the same rate, thereby adding to the uncertainty of the timing relationship between the video data and analog data.

Therefore it is desirable to provide a delay mechanism that adjusts the presentation of the audio data and/or the presentation of the video data such that the audio data is presented in synchronization with the appropriate video data.

SUMMARY OF THE INVENTION

The systems and methods described herein synchronize the presentation of audio data with the appropriate video data by determining a video presentation delay associated with the processing of the video data. The value of the video presentation delay is used to delay the presentation of the corresponding audio data such that the audio data is presented as substantially the same time as the associated video data.

In one embodiment, a transport stream is received containing video data and audio data. This embodiment determines the time required to process the video data contained in the transport stream and the time required to process the audio data contained in the transport stream. A determination is made regarding the difference in time to process the video data contained in the transport stream as compared to the audio data contained in the transport stream. Presentation of the audio data is delayed by the difference in time to process the video data contained in the transport stream as compared to the audio data contained in the transport stream.

According to one aspect of the invention, the determining of a time required to process the video data contained in the transport stream includes calculating a video presentation delay by comparing a presentation time stamp and a system time clock.

In a particular embodiment, delaying presentation of the audio data includes storing the audio data in a buffer with a delay that corresponds to the difference in time to process the video data contained in the transport stream as compared to the audio data contained in the transport stream.

BRIEF DESCRIPTION OF THE DRAWINGS

The same reference numerals are used throughout the drawings to reference like components and features.

DETAILED DESCRIPTION

Figure 1:
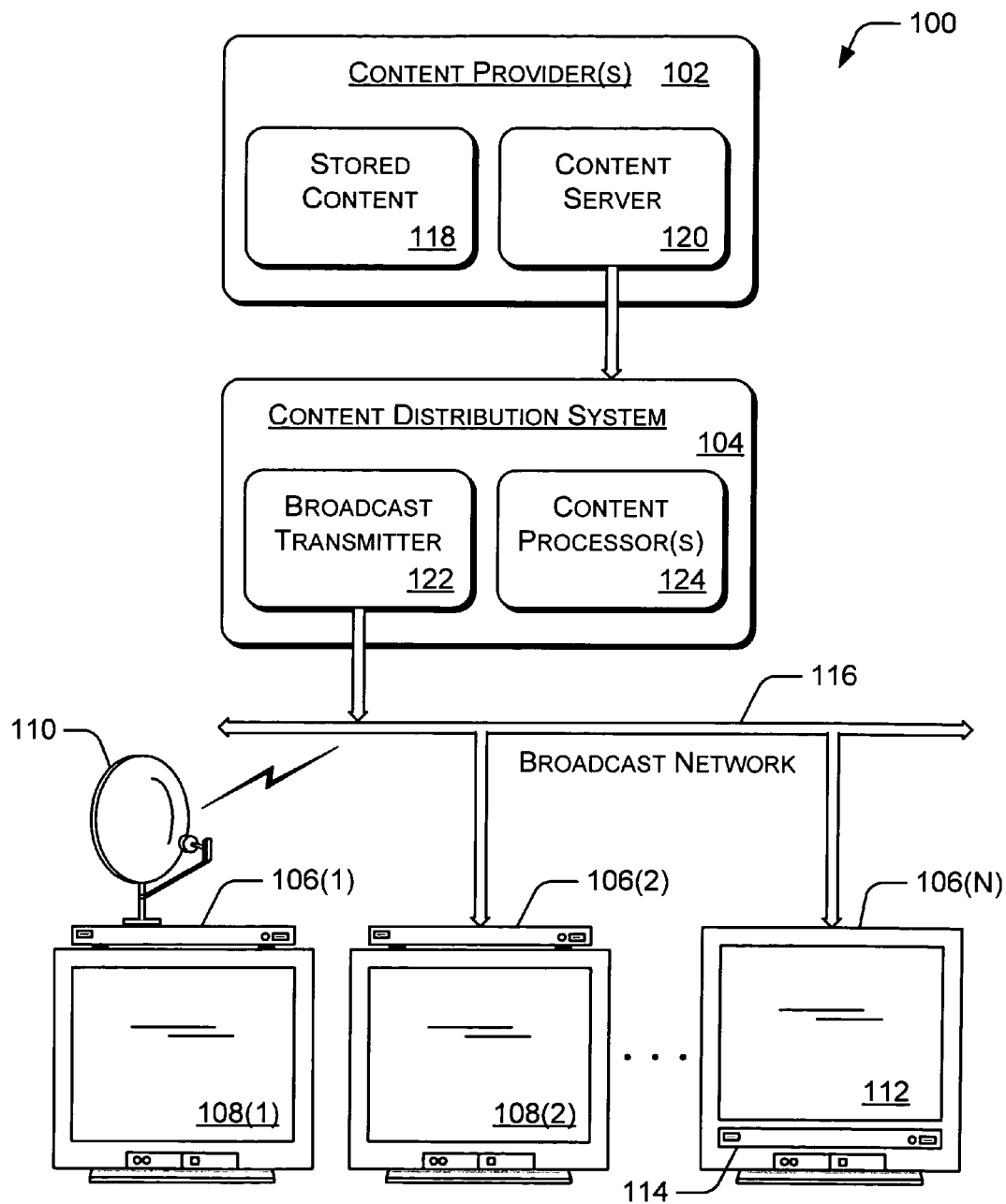
FIG. 1 illustrates an exemplary environment in which the methods and systems described herein may be implemented.

FIG. 1 illustrates an exemplary environment 100 in which the methods and systems described herein may be implemented. One or more content providers 102 include stored content 118 and a content server 120. Content server 120 controls the movement of content (including stored content 118) from the content provider 102 to a content distribution system 104, which is coupled to the content provider. Additionally, the content server 120 controls the movement of live content (e.g., content that was not previously stored by the content provider) and content stored at other locations to the content distribution system.

The content distribution system 104 contains a broadcast transmitter 122 and one or more content processors 124. Broadcast transmitter 122 broadcasts signals (e.g., cable television signals) across a broadcast network 116, such as a cable television network. Broadcast network 116 may include wired or wireless media using any broadcast format or broadcast protocol. Content processor 124 processes the content received from content provider 102 prior to transmitting the content across the broadcast network 116. A particular content processor may encode or otherwise process the received content into a format that is understood by multiple client devices 106 coupled to the broadcast network 116. Although FIG. 1 shows a single content provider 102 and a single content distribution system 104, a particular environment may include any number of content providers coupled to any number of content distribution systems.

A client device 106(1) receives broadcast content from a satellite-based transmitter via a satellite dish 110. Client device 106(1) is also referred to as a set-top box, game console or a satellite receiving device. Client device 106(1) is coupled to a television 108(1) for presenting the content received by the client device (i.e., audio data and video data) as well as a graphical user interface. A particular client device 106 may be coupled to any number of televisions 108. Similarly, any number of client devices 106 may be coupled to a television 108. Another client device 106(2) is coupled to receive broadcast content from broadcast network 116 and provide the received content to a television 108(2). Another client device 106(N) is a combination of a television 112 and a set-top box 114. In this example, the various components and functionality of the set-top box are incorporated into the television, rather than using two separate devices. The set-top box incorporated into the television may receive broadcast signals via a satellite dish (similar to satellite dish 110) and/or via broadcast network 116. In alternate embodiments, client devices 106 may receive broadcast signals via the Internet or any other broadcast medium.

Figure 2:
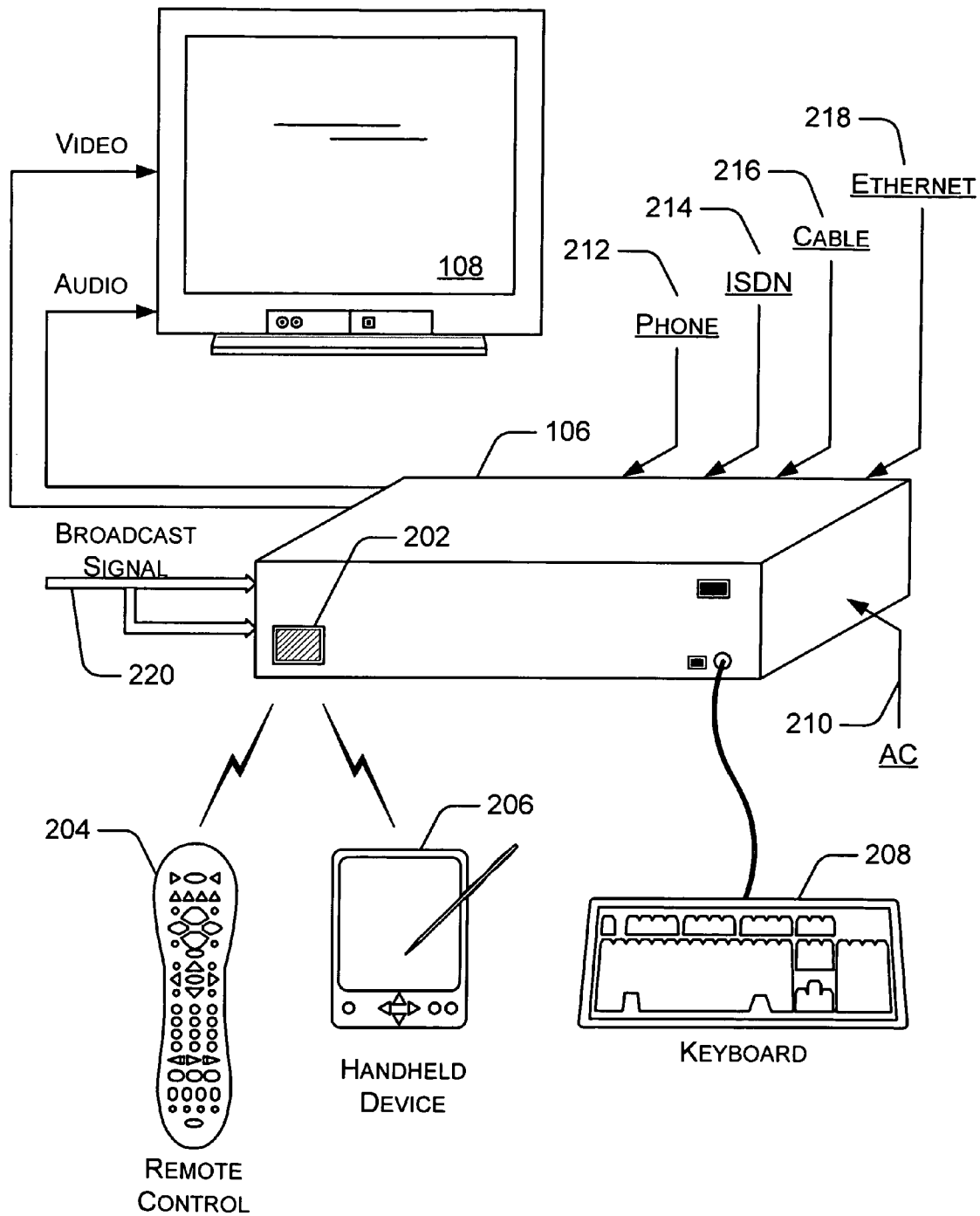
FIG. 2 is a block diagram of an example client device, a television, and various input devices that interact with the client device.

FIG. 2 is a block diagram of an example client device 106, television 108, and various input devices that interact with the client device. As discussed above, client device 106 may also be referred to as a set-top box, game console or a satellite receiver. Client device 106 includes a wireless receiving port 202 (e.g., an infrared (IR) wireless port) for receiving wireless communications from a remote control device 204, a handheld device 206 (such as a personal digital assistant (PDA) or handheld computer), or other wireless device, such as a wireless keyboard. Additionally, a wired keyboard 208 is coupled to client device 106 for communicating with the client device. In alternate embodiments, remote control device 204, handheld device 206, and/or keyboard 208 may us an RF communication link (or other mode of transmission) to communicate with client device 106.

Client device 106 receives one or more broadcast signals 220 from one or more broadcast sources (e.g., from a broadcast network or via satellite). Client device 106 includes hardware and/or software for receiving and decoding broadcast signal 220, such as an NTSC, PAL, SECAM or other TV system video signal, and providing video data to the television 108. Client device 106 also includes hardware and/or software for providing the user with a graphical user interface by which the user can, for example, access various network services, configure the client device 106, and perform other functions.

Client device 106 receives AC power on line 110. Client device 106 is capable of communicating with other devices via a conventional telephone link 212, an ISDN link 214, a cable link 216, and an Ethernet link 218. A particular client device 106 may use any one or more of the various communication links 212-218 at a particular instant. Client device 106 also generates a video signal and an audio signal, both of which are communicated to television 108. The video signals and audio signals can be communicated from client device 106 to television 108 via an RF (radio frequency) link, S-video link, composite video link, component video link, or other communication link. Although not shown in FIG. 2, a particular client device 106 may include one or more lights or other indicators identifying the current status of the client device. Additionally, a particular client device 106 may include one or more control buttons or switches (not shown) for controlling operation of the client device.

Figure 3:
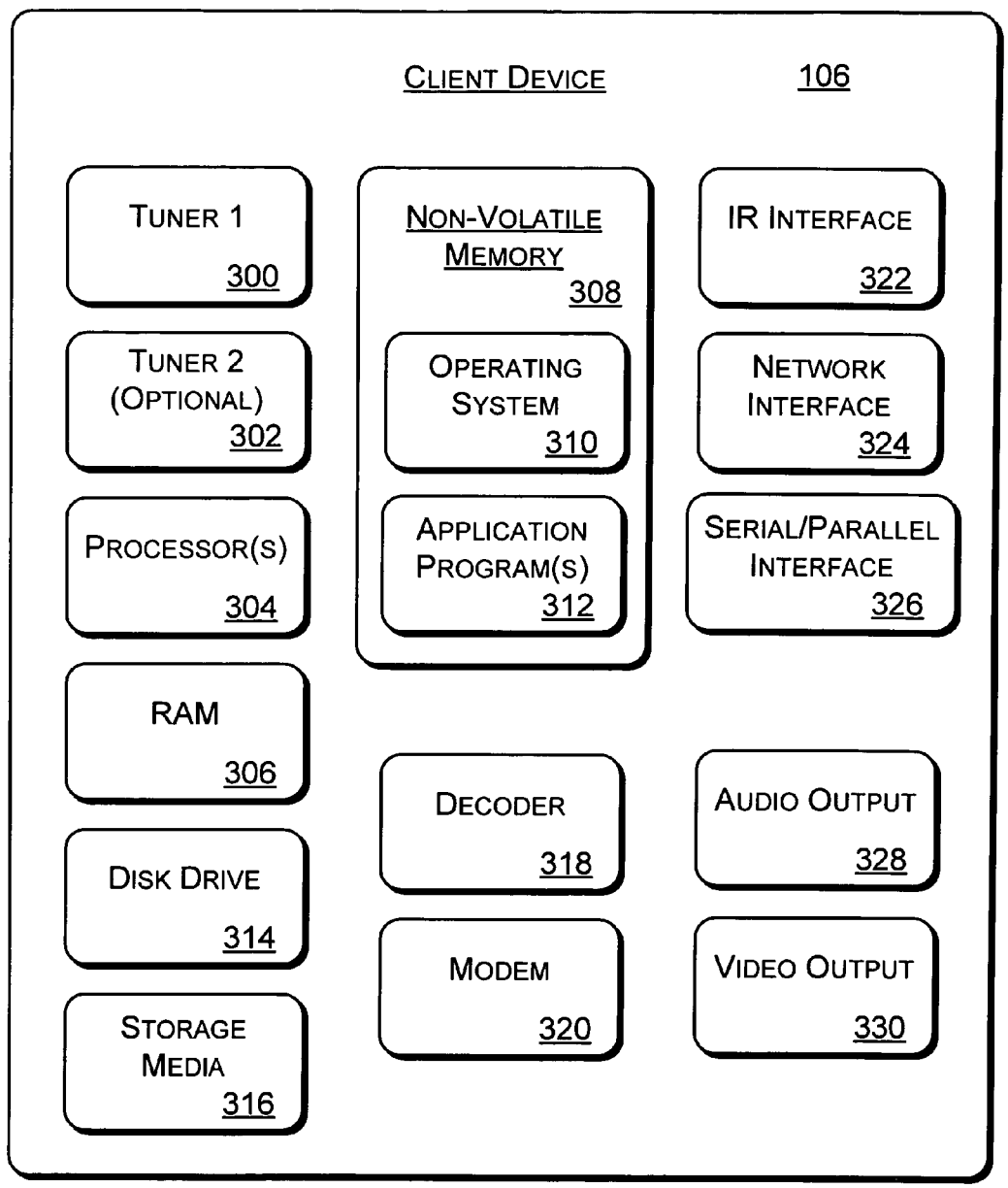
FIG. 3 is a block diagram of selected components of the client device shown in FIGS. 1 and 2.

FIG. 3 is a block diagram of selected components of the client device 106 shown in FIGS. 1 and 2. Client device 106 includes a first tuner 300 and an optional second tuner 302, one or more processors 304, a random access memory (RAM) 306, and a non-volatile memory 308 that contains, for example, an operating system 310 and one or more application programs 312. Client device 106 also includes a disk drive 314 and storage media 316. Although client device 106 is illustrated having both a RAM 306 and a disk drive 314, a particular device may include only one of the memory components. Additionally, although not shown, a system bus typically couples together the various components within client device 106.

Processor(s) 304 process various instructions to control the operation of client device 106 and to communicate with other electronic and computing devices. The memory components (e.g., RAM 306, disk drive 314, storage media 316, and non-volatile memory 308) store various information and/or data such as configuration information and graphical user interface information.

Client device 106 also includes a decoder 318, such as an MPEG-2 decoder that decodes MPEG-2-encoded signals. A modem 320 allows client device 106 to communicate with other devices via a conventional telephone line. An IR interface 322 allows client device 106 to receive input commands and other information from a user-operated device, such as a remote control device or an IR keyboard. Client device 106 also includes a network interface 324, a serial/parallel interface 326, an audio output 328, and a video output 330. Interfaces 324 and 326 allow the client device 106 to interact with other devices via various communication links. Although not shown, client device 106 may also include other types of data communication interfaces to interact with other devices. Audio output 328 and video output 330 provide signals to a television or other device that processes and/or presents the audio and video data. Although client 106 is illustrated having multiple interfaces, a particular client may only include one or two such interfaces.

Client device 106 also includes a user interface (not shown) that allows a user to interact with the client device. The user interface may include indicators and/or a series of buttons, switches, or other selectable controls that are manipulated by a user of the client device.

General reference is made herein to one or more client devices, such as client device 106. As used herein, "client device" means any electronic device having data communications, data storage capabilities, and/or functions to process signals, such as broadcast signals, received from any of a number of different sources.

Figure 4:
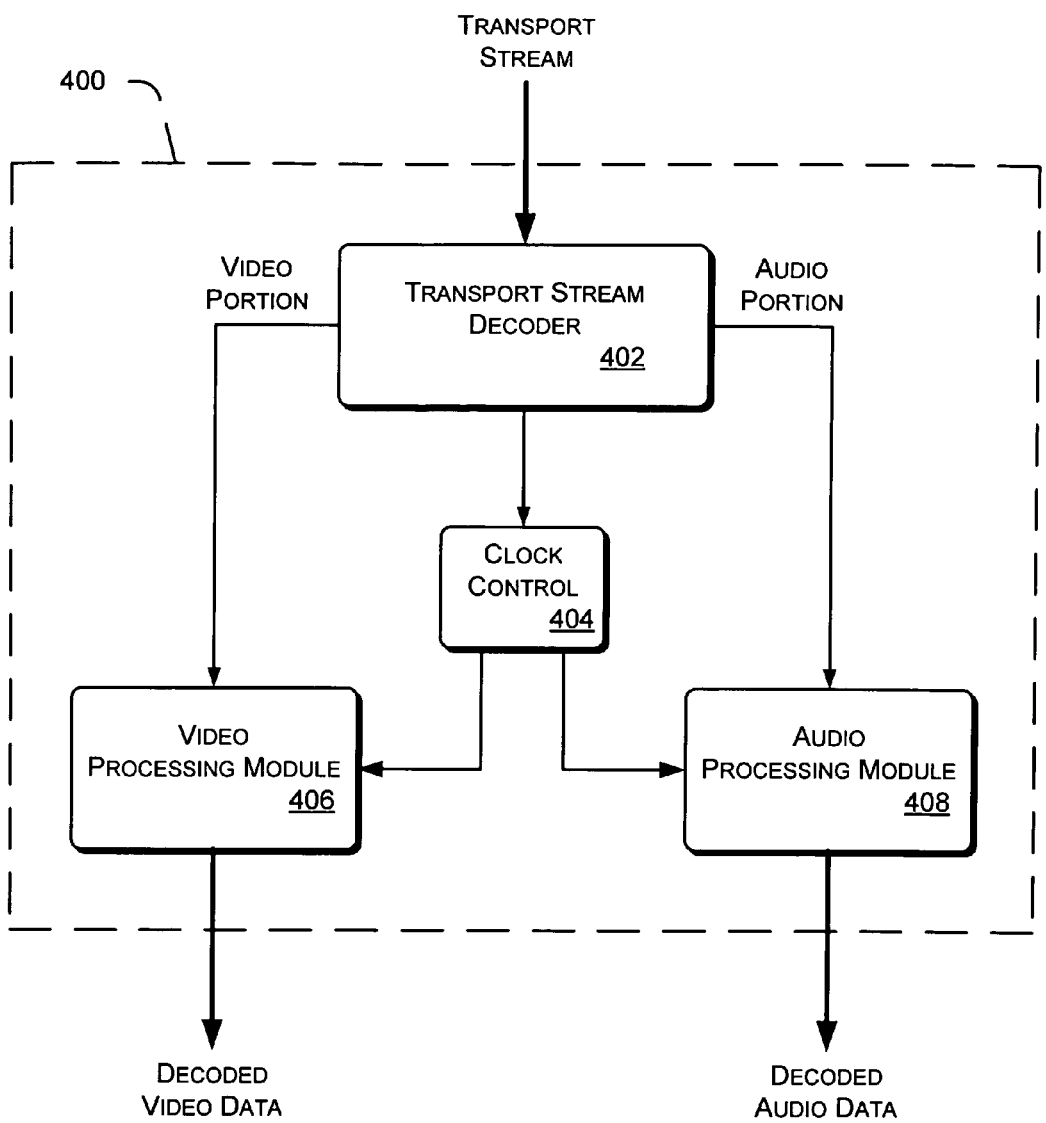
FIG. 4 is a block diagram of an exemplary system that decodes transport streams.

FIG. 4 is a block diagram of an exemplary system 400 that decodes one or more transport streams. A "transport stream" may also be referred to as a "program stream" or a "data stream". System 400 may use one or more of the components shown in FIG. 3, such as processor(s) 304, application program(s) 312, and decoder 318. A transport stream decoder 402 receives a transport stream, such as an MPEG-2 data stream, and separates the video and audio portions of the transport stream. Transport stream decoder 402 provides the video portion of the transport stream to a video processing module 406 and provides the audio portion of the transport stream to an audio processing module 408. Video processing module 406 handles the decoding of the video portion of the transport stream and generates decoded video data that is formatted for display on a display device, such as a television. Audio processing module 408 handles the decoding of the audio portion of the transport stream and generates decoded audio data that is formatted for broadcast by a broadcast device, such as one or more speakers in a television.

The transport stream also includes timing information (e.g., time stamps) that is extracted by transport stream decoder 402 and provided to a clock control module 404. Clock control module 404 provides one or more control signals to video processing module 406 and audio processing module 408 to synchronize the decoded video data with the decoded audio data.

A particular embodiment of the invention will be described in the context of a transport stream encoded using the MPEG-2 (Moving Pictures Experts Group). MPEG-2 is a standard for digital video and digital audio compression. MPEG-2 supports a variety of audio/video formats, including legacy TV, HDTV (High-Definition Television), and five channel surround sound. For example, MPEG-2 is capable of providing broadcast-quality images of 720×480 resolution used in DVD movies. However, the methods and systems described herein can be used with any type of data stream using any type of encoding format as well as data streams that do not use any encoding.

A particular broadcast format provides for the transmission of X image frames per second, such as 30 frames per second or 60 frames per second. A particular frame includes two interlaced fields, in which each field includes a specific number of horizontal scan lines. The broadcast and display of image frames is described in connection with a conventional analog television having a cathode ray tube (CRT) with an electron beam. The electron beam is controlled such that the electron beam is scanned across the screen of the CRT to generate the appropriate image.

The first few horizontal scan lines may be used to synchronize the television receiver and to return the electron beam to the top of the screen. The electron beam is disabled (also referred to as "blanked") during this time so that the electron beam does not generate a visible line from the bottom of the screen to the top of the screen when being returned to the top of the screen. These first few horizontal scan lines are commonly referred to as the "vertical blanking interval" lines (or VBI lines).

The odd scan lines of the frame (i.e., frame line 1, frame line 3, etc.) are received first and are referred to as the "odd field". A particular number of these odd lines are the VBI lines. The VBI lines synchronize the television receiver for the subsequent scanning of the horizontal scan lines of a viewable portion of the frame. For each horizontal scan line, the electron beam scans from left to right across the screen. When the electron beam reaches the right edge of the screen, the electron beam is returned to the left edge of the screen in preparation for the scanning of the next scan line. After the scanning of each odd scan line in the viewable portion, the electron beam is "blanked" as the electron beam is returned to left edge of the screen in preparation for the start of the next scan line. This blanking time is referred to as the "horizontal blanking interval" of the frame.

After the last odd scan line has finished, the even scan lines of the frame (i.e., frame line 2, frame line 4, etc.) are received and are referred to as the "even field". As with the odd field discussed above, a particular number of the scan lines of the even field are VBI lines. The electron beam is blanked during the scanning of the even VBI lines such that the electron beam can be returned to the top of the screen without generating a line on the screen. After the scanning of all the even VBI lines, the even scan lines of the viewable portion are scanned in a manner similar to the scanning of the odd scan lines discussed above. The viewable horizontal scan lines of the odd and even fields together cause the electron beam to scan across the screen of the television to create the viewable television image. Although the example described above applies to interlaced video signals, the methods and systems described herein can be used with both interlaced and non-interlaced video signals.

Referring again to FIG. 4, there is a video processing delay that is defined as the time required to process (using hardware and/or software) the video portion of a received transport stream. With reference to FIG. 4, the video processing delay is the time that elapses between receiving a particular set of video data at the transport stream decoder 402 and outputting the corresponding decoded video data from the video processing module 406. Similarly, there is an audio processing delay that is defined as the time required to process (using hardware and/or software) the audio portion of a received transport stream. With reference to FIG. 4, the audio processing delay is the time that elapses between receiving a particular set of audio data at the transport stream decoder 402 and outputting the corresponding decoded audio data from the audio processing module 408. The video processing delay and the audio processing delay may include decoder buffering delays, decoding delays, and/or presentation delays.

Figure 5:
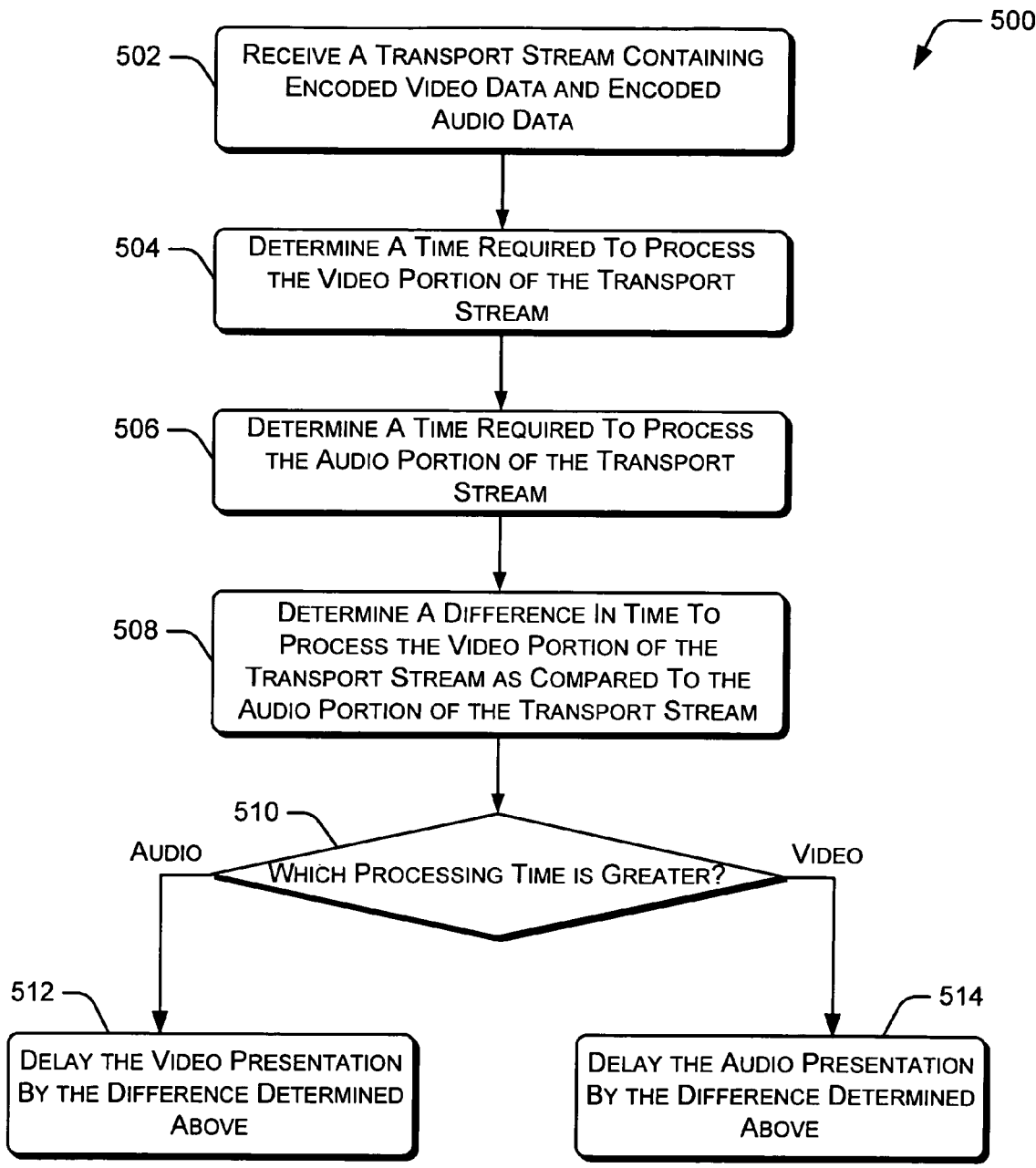
FIG. 5 is a flow diagram illustrating an embodiment of a procedure for synchronizing an audio signal with a video signal.

FIG. 5 is a flow diagram illustrating an embodiment of a procedure 500 for synchronizing an audio signal with a video signal. Initially, procedure 500 receives a transport stream containing encoded video data and encoded audio data (block 502). The transport stream may be received, for example, via a broadcast network, such as a cable television network, or via a satellite transmission system. The procedure 500 determines the time required to process the video portion of the transport stream (block 504). Next, the procedure determines the time required to process the audio portion of the transport stream (block 506). The procedure then determines the difference in time to process the video portion of the transport stream as compared to the audio portion of the transport stream (block 508). Block 510 then determines which processing time is greater (i.e., the video processing time determined at block 504 or the audio processing time determined at block 506). If the audio processing time is greater, the video presentation is delayed by the difference determined at block 508, thereby synchronizing the decoded video data with the decoded audio data. If the video processing time is greater, the audio presentation is delayed by the difference determined at block 508, thereby synchronizing the decoded audio data with the decoded video data. Additional details regarding the various actions described above with respect to FIG. 5 are provided below with reference to FIGS. 6-9.

In a particular embodiment, the decoded audio data is "substantially synchronized" with the decoded video data. "Substantially synchronized" means that there may be a slight difference (such as a few milliseconds) between the presentation of the video data and the presentation of the corresponding audio data. Such a small difference in the presentation of the audio and video data is not likely to be perceived by a user watching and listening to the presented video and audio data.

A typical transport stream is received at a substantially constant rate. In this situation, the delay that is applied to the video presentation or the audio presentation is not likely to change frequently. Thus, the procedure of FIG. 5 may be performed periodically (e.g., every few seconds or every 30 received video frames) to be sure that the delay currently being applied to the video presentation or the audio presentation is still within a particular threshold (e.g., within a few milliseconds of the required delay). Alternatively, the procedure of FIG. 5 may be performed for each new frame of video data received from the transport stream.

In another embodiment, the procedure of FIG. 5 is performed as described above, but the audio or video presentation delay is changed only if the newly calculated delay value exceeds the delay value currently being used by a threshold value (e.g., ten milliseconds). Thus, although the delay is recalculated frequently, the actual delay applied by the system is only changed when the new delay exceeds the value.

Typically, video data processing requires more time than audio data processing. Thus, in an alternative embodiment where the video processing time is known to be greater than the audio processing time, blocks 510 and 512 of FIG. 5 can be eliminated. In this embodiment, the difference determined in 508 is used to determine an additional delay that is applied to the audio presentation. Without this additional delay, the audio data might be presented to the user prior to the associated video data (i.e., not synchronized).

In a typical MPEG-2 transport stream, the timing is defined in terms of a common system clock, referred to as a System Time Clock (STC). Synchronization of audio and video data is accomplished using Presentation Time Stamps (PTS) contained in the transport stream. In a particular embodiment, an MPEG-2 transport stream has an associated system clock frequency of 27 MHz (±810 Hz). Thus, a bit rate of 27,000,000 bits per second indicates that one byte of data is transferred every eight cycles of the system clock.

Figure 6:
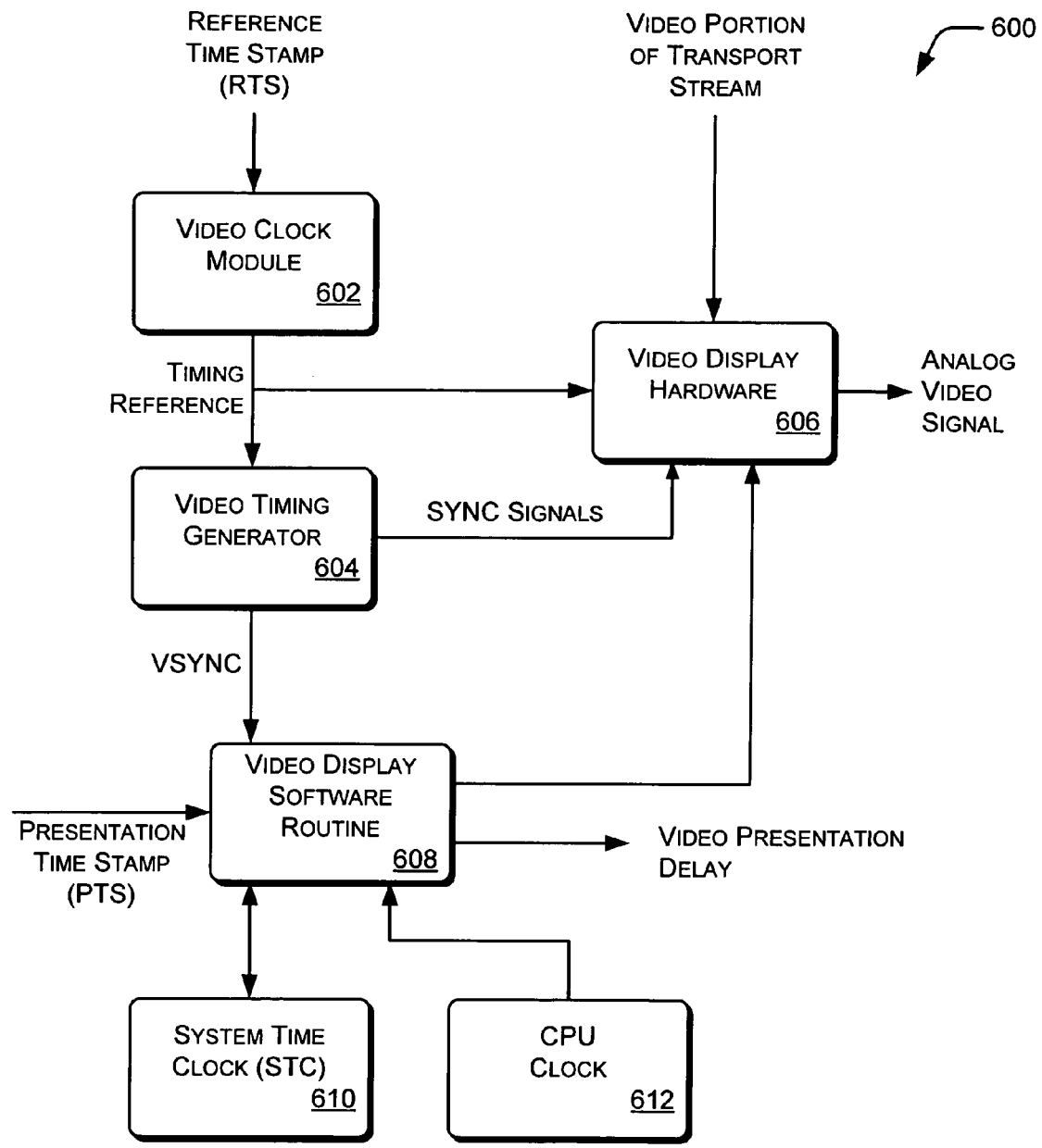
FIG. 6 is a block diagram of an exemplary system for processing a video portion of a transport stream.

FIG. 6 is a block diagram of an exemplary system 600 for processing a video portion of a transport stream. A video clock module 602 receives a reference time stamp (RTS), which is contained in the MPEG-2 transport stream. The video clock module 602 is locked to the RTS in the transport stream. Video clock module 602 generates a timing reference signal that is provided to a video timing generator 604 and video display hardware 606. Video timing generator 604 generates one or more sync signals used by the video display hardware 606 to format the video output to the television. Video timing generator 604 also generates a VSYNC (vertical retrace sync) signal, which generates a software interrupt used by a video display software routine 608. The VSYNC signal is generated each time a complete image field (e.g., an odd field or an even field) has been rendered and the electron beam is returned to the beginning of the CRT to begin rendering the next image field. Alternatively, the VSYNC signal may be generated each time a complete frame has been rendered.

The video display hardware 606 receives the video portion of the transport stream (e.g., by reading the received video frame from a video memory device). The video portion of the transport stream represents decoded video data. The video decoding can be performed in hardware, software, or a combination of hardware and software. In a particular embodiment, the video decoding is performed by the transport stream decoder 402 (FIG. 4).

Video display hardware 606 also receives information from video display software routine 608 regarding when to display the next frame of video data. The video data is formatted and converted to an analog video signal that is synchronized to the video timing generator 604. The analog video signal is output from the video display hardware 606 to a television or other display device.

The video display software routine 608 receives the VSYNC signal from the video timing generator 604. When the VSYNC interrupt occurs, a time stamp is taken from a CPU clock 612. The CPU clock is a free running clock based on the CPU bus frequency. The CPU clock can be read, for example, via a kernel API. The time stamp resulting from the VSYNC interrupt is used as a reference for a system time clock (STC) 610. The system time clock (STC) is derived from the video timing generator 604 (using the VSYNC interrupt) and the CPU clock 612. For each VSYNC interrupt, the STC is advanced the number of ticks in one field time (i.e., the number of clock cycles required to transmit a full field of data in the transport stream). The CPU clock is used to interpolate the appropriate number of ticks between VSYNC interrupts. Since the frequency of the MPEG data transmission frequency is known (27 MHz), and the amount of data bytes required to fill a field of data is known, the number of ticks to advance the STC can be determined. The formula to calculate the number of ticks to advance the STC clock is as follows:

No. of Ticks to Advance=$T$field*27,000,000

In the United State, Tfield=16.6833333 . . . milliseconds.

The video display software routine 608 compares the presentation time stamp (PTS) encoded in the video frame and the system time clock 610 at the time of the VSYNC interrupt. The difference in time between the PTS and the STC at the time of the VSYNC interrupt is the video presentation delay, which is provided to the audio processing system to delay the audio output by the video presentation delay, thereby synchronizing the audio output with the video output.

Figure 7:
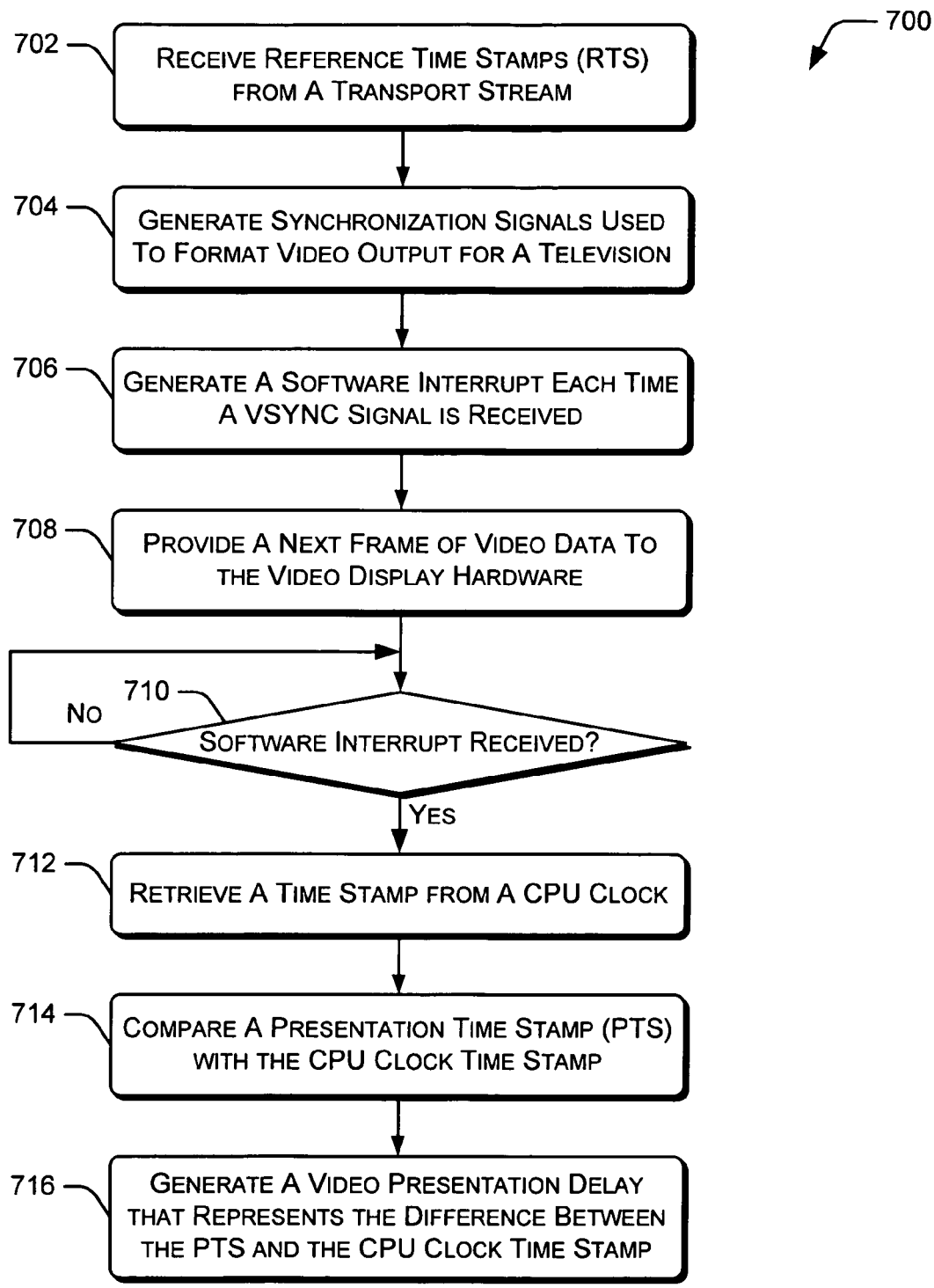
FIG. 7 is a flow diagram illustrating an embodiment of a procedure for processing a video portion of a transport stream using the system shown in FIG. 6.

FIG. 7 is a flow diagram illustrating an embodiment of a procedure 700 for processing a video portion of a transport stream using the system shown in FIG. 6. Initially, the procedure receives reference time stamps (RTS) from a transport stream (block 702). The procedure then generates synchronization signals used to format the video data from the transport stream for output to a television or other display device (block 704). The procedure generates a software interrupt each time a VSYNC signal is received (block 706). At block 708, the procedure provides a next frame of video data to the video display hardware for processing. This processing by the video display hardware may be performed concurrently with the remaining activities of procedure 700.

The procedure then determines whether a software interrupt has been received (block 710). If not, the procedure awaits the next software interrupt. If a software interrupt has been received, the procedure retrieves a time stamp from a CPU clock (block 712). A presentation time stamp (PTS) is compared with the CPU clock time stamp (block 714). A video presentation delay is generated that represents the difference between the PTS and the CPU clock time stamp (block 716).

Figure 8:
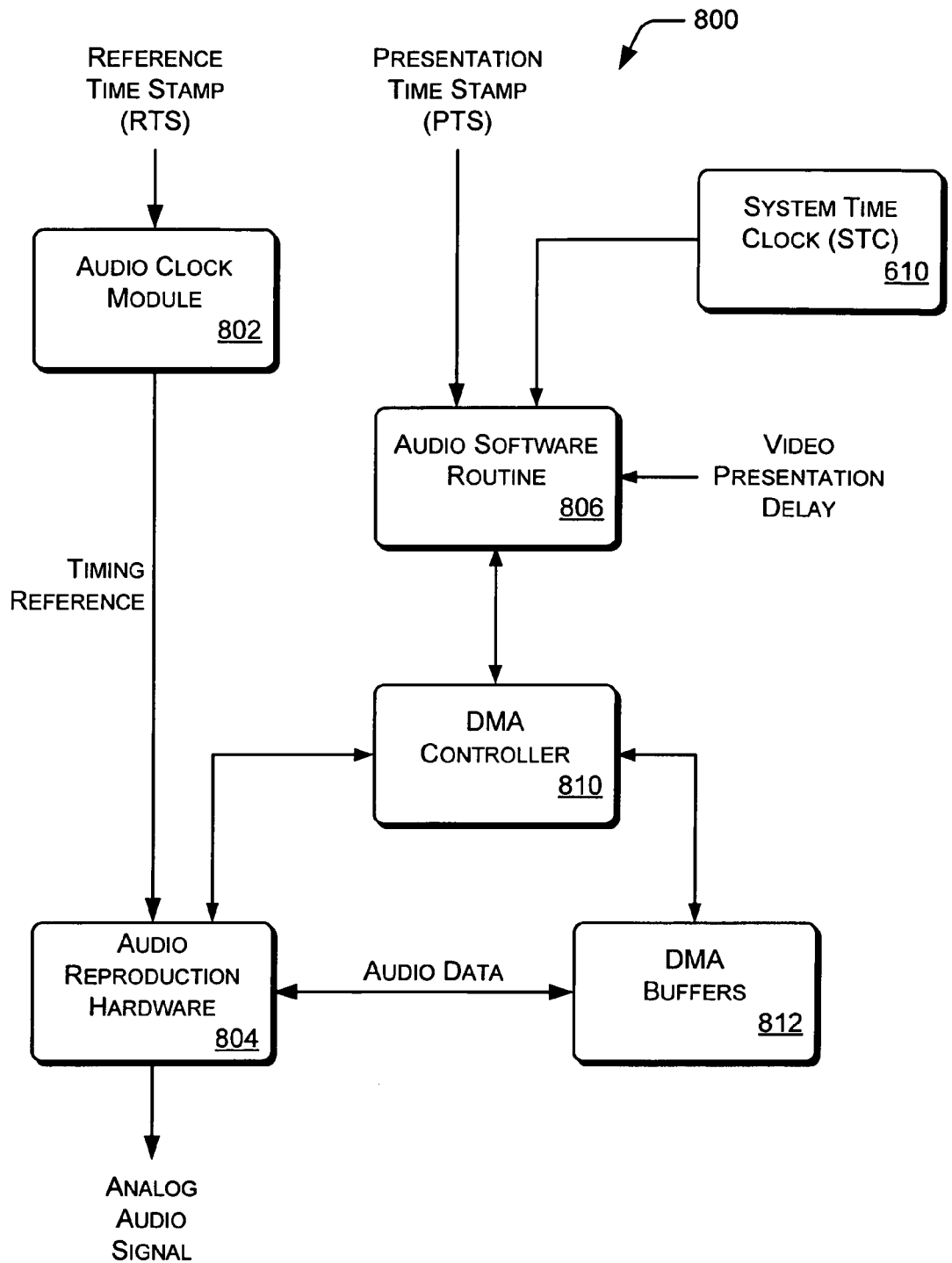
FIG. 8 is a block diagram of an exemplary system for processing an audio portion of a transport stream.

FIG. 8 is a block diagram of an exemplary system 800 for processing an audio portion of a transport stream. An audio clock module 802 is locked to the reference time stamp (RTS) contained in the transport stream. The audio clock module 802 generates a timing reference used by audio reproduction hardware 804, along with other data, to generate an analog audio signal that is provided to, for example, a television. The audio reproduction hardware 804 receives audio data from one or more DMA buffers 812, which are controlled by a DMA controller 810. The audio reproduction hardware 804 converts the data received from DMA buffers 812 into an analog audio signal.

An audio software routine 806 is coupled to the DMA controller 810 and a system time clock 610 (e.g., the same system time clock shown in FIG. 6). Audio software routine 806 receives presentation time stamps (PTS) from the transport stream and receives video presentation delay information generated by the video display software routine 608 shown in FIG. 6. Audio software routine 806 controls the placement of decoded audio frames in the DMA buffers 812 (via DMA controller 810) with a delay matching the video presentation delay reported by the video display software routine. Specifically, audio software routine 806 reads a presentation time stamp from each audio frame before it is decoded. The audio software routine 806 then reads the system time clock 610, the video presentation delay, and the position of the DMA read pointer (provided by the DMA controller 810). The audio frame is then decoded and stored in the DMA buffers 812 with a delay that matches the video presentation delay. The audio data is decoded in, for example, audio software routine 806. Alternatively, the audio data may be decoded in hardware or a combination of hardware and software.

Figure 9:
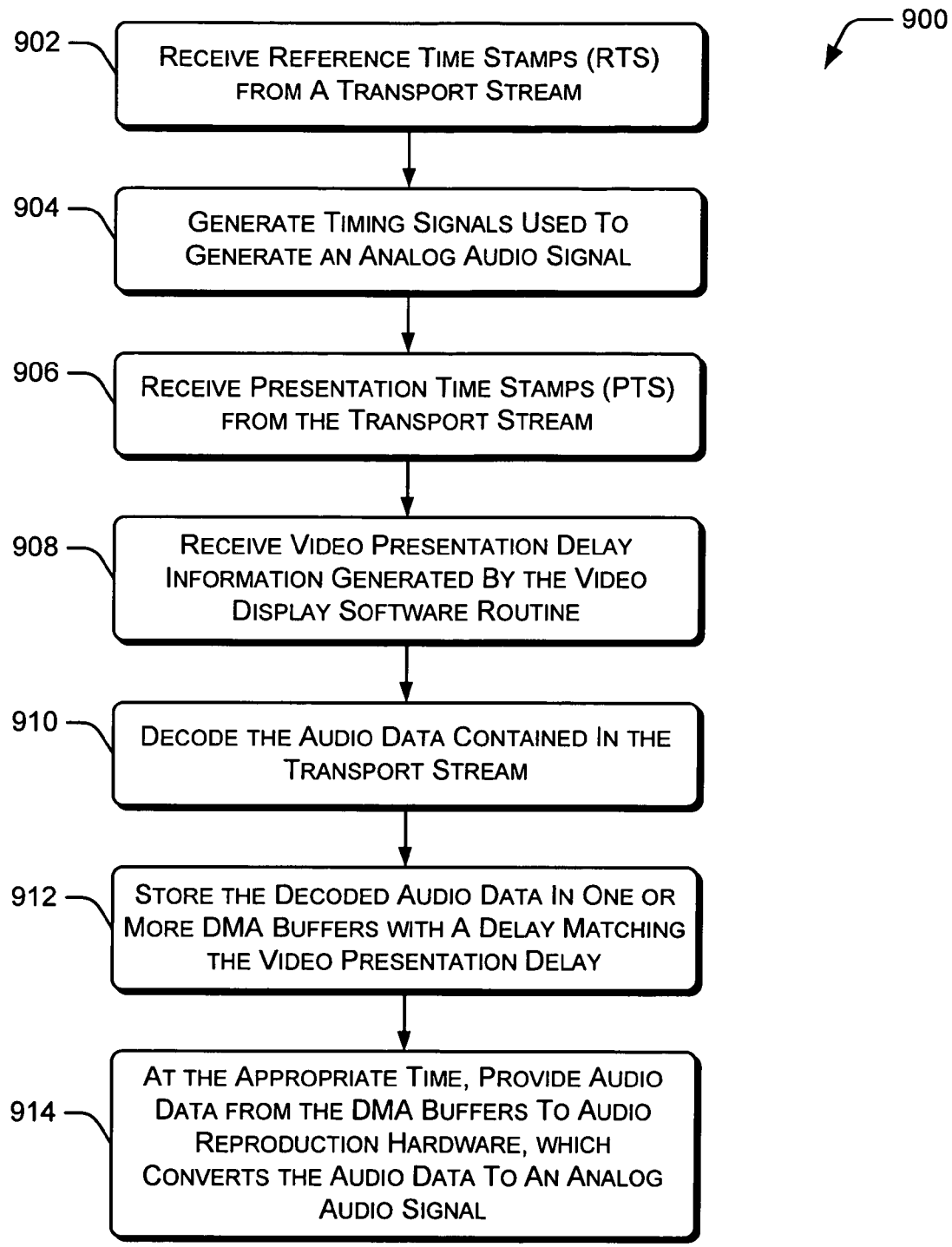
FIG. 9 is a flow diagram illustrating an embodiment of a procedure for processing an audio portion of a transport stream using the system shown in FIG. 8.

FIG. 9 is a flow diagram illustrating an embodiment of a procedure 900 for processing an audio portion of a transport stream using the system shown in FIG. 8. Initially, procedure 900 receives reference time stamps (RTS) from a transport stream (block 902). The procedure then generates timing signals used to generate an analog audio signal (block 904). Presentation time stamps (PTS) are then received from the transport stream (block 906). The procedure also receives video presentation delay information generated by the video display software routine (block 908).

The procedure 900 then decodes the audio data contained in the transport stream (block 910). The decoded audio data is then stored in one or more DMA buffers with a delay matching the video presentation delay (block 912). At the appropriate time, the audio data is provided from the DMA buffers to the audio reproduction hardware (block 914). The audio reproduction hardware converts the audio data to an analog signal that can be provided to a presentation device, such as the speakers in a television.

Portions of the systems and methods described herein may be implemented in hardware or a combination of hardware, software, and/or firmware. For example, one or more application specific integrated circuits (ASICs) or programmable logic devices (PLDs) could be designed or programmed to implement one or more portions of the video and/or audio processing systems and procedures.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   receiving a transport stream containing video data and audio data;
   identifying a presentation time stamp in the transport stream;
   identifying a value associated with a system time clock;
   determining a time required to process the video data contained in the transport stream by comparing the presentation time stamp and the system time clock; and
   delaying presentation of the audio data by the time required to process the video data contained in the transport stream, wherein delaying presentation of the audio data by the time required to process the video data contained in the transport stream includes:
   determining a position of a DMA read pointer; and
   storing the audio data in a DMA buffer with a delay that matches the time required to process the video data contained in the transport stream.

2. A method as recited in claim 1, wherein delaying presentation of the audio data by the time required to process the video data contained in the transport stream is performed if the time required to process the video data contained in the transport stream exceeds a threshold.

3. A method as recited in claim 1, wherein delaying presentation of the audio data by the time required to process the video data contained in the transport stream includes storing the audio data in a buffer with a delay that corresponds to the time required to process the video data contained in the transport stream.

4. A method as recited in claim 1, further comprising decoding the received video data.

5. A method as recited in claim 1, further comprising decoding the received audio data.

6. An apparatus comprising:
   a transport stream decoder coupled to receive a transport stream and configured to separate audio data and video data from the transport stream;
   a video processing module configured to receive video data from the transport stream decoder;
   an audio processing module configured to receive audio data from the transport stream decoder; and
   a clock control module coupled to the transport stream decoder to receive timing data from the transport stream, the clock control module further coupled to the video processing module and the audio processing module and further configured to delay presentation of the audio data by a difference in time to process the video data as compared to the audio data, wherein delaying presentation of the audio data by the time required to process the video data contained in the transport stream includes:
   determining a position of a DMA read pointer; and
   storing the audio data in a DMA buffer with a delay that matches the time required to process the video data contained in the transport stream.

7. An apparatus as recited in claim 6, wherein the audio processing module delays presentation of the audio data by storing the audio data in a buffer with a delay that corresponds to the difference in time to process the video data as compared to the audio data.

8. An apparatus as recited in claim 6, wherein the transport stream decoder is further configured to decode the video data and the audio data contained in the transport stream.

9. An apparatus as recited in claim 6, wherein the transport stream decoder is further configured to decode the video data and the audio data contained in the transport stream as well as timing information contained in the transport stream.

10. An apparatus comprising:
    a system time clock configured to maintain a current system;
    a video display software routine executing on a processor and configured to receive a first time stamp from a transport stream and receive a current system time from the system time clock, the video display software routine further configured to determine a video presentation delay based on the first time stamp and the current system time; and
    an audio software routine executing on the processor and configured to receive the video presentation delay from the video display software routine and delay presentation of audio data contained in the transport stream based on the video presentation delay, wherein delaying presentation of the audio data by the time required to process the video data contained in the transport stream includes:

determining a position of a DMA read pointer; and
   storing the audio data in a DMA buffer with a delay that matches the time required to process the video data contained in the transport stream.

11. An apparatus as recited in claim 10, further comprising audio reproduction hardware configured to retrieve audio data stored in the DMA buffer and generate an audio analog signal associated with the audio data.

12. An apparatus as recited in claim 10, wherein the video display software routine determines the video presentation delay each time a vertical retrace sync signal is received.

13. An apparatus as recited in claim 10, wherein the video display software routine determines the video presentation delay at periodic intervals.

* * * * *